United States Patent [19]
De La Fuente

[11] Patent Number: 6,142,270
[45] Date of Patent: Nov. 7, 2000

[54] TIE DEVICE FOR TRANSMITTING FORCE BETWEEN TWO STRUCTURAL ELEMENTS

[75] Inventor: Carlos De La Fuente, Nanterre, France

[73] Assignee: Freyssinet International (STUP), Velizy-Villacoubly, France

[21] Appl. No.: 09/101,200

[22] PCT Filed: Jan. 8, 1997

[86] PCT No.: PCT/FR97/00033

§ 371 Date: Nov. 4, 1998

§ 102(e) Date: Nov. 4, 1998

[87] PCT Pub. No.: WO97/25498

PCT Pub. Date: Jul. 17, 1997

[30] Foreign Application Priority Data

Jan. 9, 1996 [FR] France .................................. 96 00164

[51] Int. Cl.⁷ ...................................................... F16F 9/22
[52] U.S. Cl. ........................................... 188/304; 267/224
[58] Field of Search ..................... 267/224, 225, 267/136; 188/297, 303, 304

[56] References Cited

U.S. PATENT DOCUMENTS

| | | | |
|---|---|---|---|
| 739,912 | 9/1903 | Otis | 188/304 |
| 2,090,751 | 8/1937 | Deutsch . | |
| 2,321,818 | 4/1943 | Johnson | 188/304 |
| 2,344,050 | 3/1944 | Morton | 188/304 |
| 2,764,404 | 9/1956 | Mercier | 267/224 |
| 3,888,436 | 6/1975 | Sealy | 188/304 |
| 5,462,141 | 10/1995 | Taylor . | |

FOREIGN PATENT DOCUMENTS

| | | |
|---|---|---|
| WO 92/13158 | 8/1992 | European Pat. Off. . |
| 2 544 432 | 10/1984 | France . |
| 2 625 540 | 7/1989 | France . |
| 719666 | 12/1954 | United Kingdom . |
| 1 362 409 | 8/1974 | United Kingdom . |

Primary Examiner—Matthew C. Graham
Attorney, Agent, or Firm—Sughrue, Mion, Zinn, Macpeak & Seas, PLLC

[57] ABSTRACT

The invention is related to a tie device for use between two structural elements (10, 20) of a civil engineering structure, such as, for example a bridge. The tie device allows the two structural elements to be displaced relative to each other during slow movements, and prevents the two structural elements from being displaced relative to each other during rapid movements. In one embodiment of the invention, the tie device comprises a cylinder (30) which is stationary relative to the first structural element (10), and which defines two chambers (31, 32) that contain a fluid and that are interconnected via an orifice (39). The cylinder (30) includes a wall (33) that separates the two chambers. Each chamber is defined at its end remote from the wall (33) by moving pistons (37, 38) that are secured to the second structural element (20).

9 Claims, 2 Drawing Sheets

TIE DEVICE FOR TRANSMITTING FORCE BETWEEN TWO STRUCTURAL ELEMENTS

The present invention relates to a tie device for use between two elements of a civil engineering structure, and it relates more particularly to a hydraulic force-transmitting device for use between first and second elements of a civil engineering structure, such as a bridge.

Tie devices serve in particular to damp the effects of an earthquake, in particular in bridges, either by dissipating energy, or by transmitting force, during the rapid movements caused by the earthquake.

More particularly, force-transmitting devices enable two structural elements (in a bridge these elements are in general, firstly the deck of the bridge and secondly its foundations, piers, or abutments) to move relative to each other during movements that are mainly due to the effects of temperature variations. In the event of rapid movement, e.g. in the event of an earthquake, the device locks and the two elements are coupled rigidly together.

Most force-transmitting devices are of the hydraulic or oleodynamic type. Such a device essentially consists of a cylinder or actuator provided with two chambers separated by a piston. An orifice of very small diameter enables a fluid to pass from one chamber to the other, thereby enabling the piston to move slowly. In the event of large and rapid stresses causing the piston to move rapidly, it is no longer possible for the fluid to flow, and the device locks.

In that type of device, the piston is generally secured to a rod which passes through the end walls of the cylinder on either side of the piston. Such a rod is connected to one of the elements of the structure, and the cylinder is connected to the other element of the structure. When the length of stroke required to enable the device to operate properly is long, e.g. in long bridges subjected to large temperature variations, the rods are long and their diameter must be increased because there is a possibility that the rod might buckle if it is subjected to a large compression force. That results in an undesirable increase in the overall dimensions of the device.

Another drawback of that oleodynamic type of transmission device is that it is necessary to add an expansion vessel or tank that is capable of absorbing the increase in the volume of the fluid due to temperature increases because, without that precaution, the internal pressure of the device could reach values that are very high. Adding such an external tank to the device, together with its associated hydraulic circuit, is considered to constitute a complication.

Document WO 92/13158 describes such a prior art device in which a moving piston is displaced between the two chambers, one of the chambers being connected to a gas accumulator that is separate from the force transmitter. That device suffers from the drawback of taking up a large amount of space.

An object of the present invention is to provide a tie device, in particular a force-transmitting device, that is compact, that is simple to manufacture and to use, and that operates reliably.

Another object of the present invention is to provide such a device that does not reproduce the above-mentioned drawbacks. In particular, an object of the present invention is to provide a tie device that reduces or eliminates the risk of the rod buckling, and that therefore enables the device to be more compact. Furthermore, another object of the present invention is to provide such device that takes up as little space as possible. In particular, an object of the invention is to avoid adding one or more external hydraulic circuits to the device.

The present invention thus provides a tie device for use between first and second elements of a civil engineering structure, the tie device being suitable for enabling said first and second structural elements to be displaced relative to each other during slow movements, and for preventing at least in part said first and second structural elements from being displaced relative to each other during rapid movements, said device including a cylinder which is stationary relative to said first structural element and which defines two chambers that contain a fluid substance and that are interconnected via an orifice, said cylinder including a wall that separates said two chambers, each chamber being defined at its end remote from said wall by a moving piston, said two moving pistons being secured to said second structural element.

In particular, said civil engineering structure may be a bridge, and said first and second structural elements may be an abutment, a pier, or a deck of a bridge.

Other characteristics and advantages of the present invention appear from the following detailed description given by way of non-limiting example and with reference to the accompanying drawings, in which.

The present invention relates to a tie device, in particular a force transmitter, for use between a first structural element 10 and a second structural element 20 of a civil engineering structure, in particular a bridge. The following detailed description is made with reference to such elements of a bridge.

Figure 1:
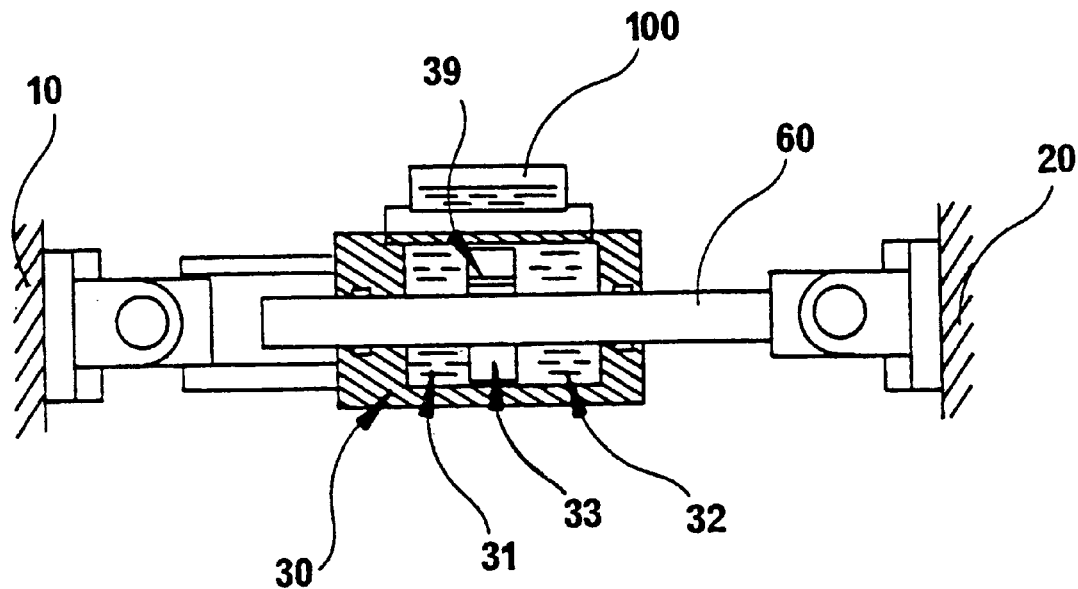
FIG. 1 is a diagrammatic view of a known tie device for use between two elements of a civil engineering structure.

With reference to FIG. 1, which shows a known tie device, and to FIGS. 2 and 3, which show two different embodiments of a device of the invention whose respective advantages are described below, a force transmitter includes a cylinder 30 (or actuator) which is stationary relative to one of the two structural elements, e.g. relative to the first structural element 10. The cylinder 30 defines two chambers 31, 32 containing a fluid substance (advantageously oil), said chambers 31, 32 being separated by a wall 33. The wall 33 is provided with a through orifice 39 which, during slow movements, interconnects said chambers 31, 32 between the structural elements 10 and 20, and, typically, it has a diameter of the order of a few tenths of a millimeter. Optionally, the orifice 39 may be provided in the body of the cylinder 30 (e.g. in the form of a groove) rather than in the wall 33, or else it may be provided in the form of an external tube interconnecting the two chambers. In the event of an earth tremor, the pressure in at least one of the chambers 31, 32 increases and it is not possible for fluid to flow through the orifice 39, so that the two structural elements are coupled rigidly together.

Optionally, one or two valves (not shown) may be provided in the orifice 39, facing one or both of the chambers 31, 32, said valves being organized to close when there is a determined increase in pressure or in flow rate, so that the two structural elements are rigidly tied together in defined manner as from a determined pressure, as from a determined flow rate, or as from a determined speed.

In force transmitters known from the prior art and as shown diagrammatically in FIG. 1, the wall 33 forms the piston mounted to move inside the cylinder 30, and said piston 33 is connected to the second structural element 20 via a rod 60 that passes through the two end walls of the cylinder 30, while the cylinder 30 is fixed to the first structural element 10. As mentioned above, the displacements of the piston 33 depend on the compression and traction forces in the rod 60. These forces can be very large, and there is a risk that the rod might buckle.

Figure 2:
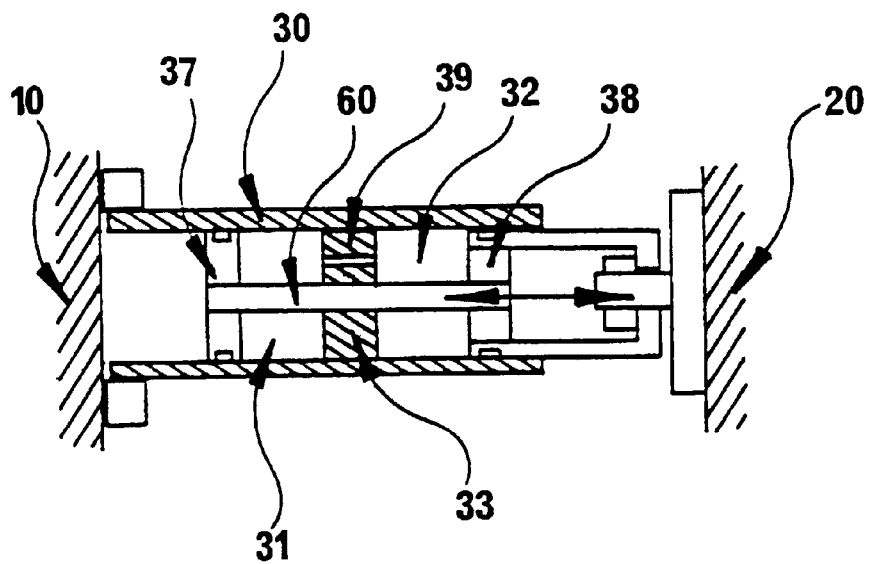
FIG. 2 is a diagrammatic view of an advantageous embodiment of a tie device of the invention.
Figure 3:
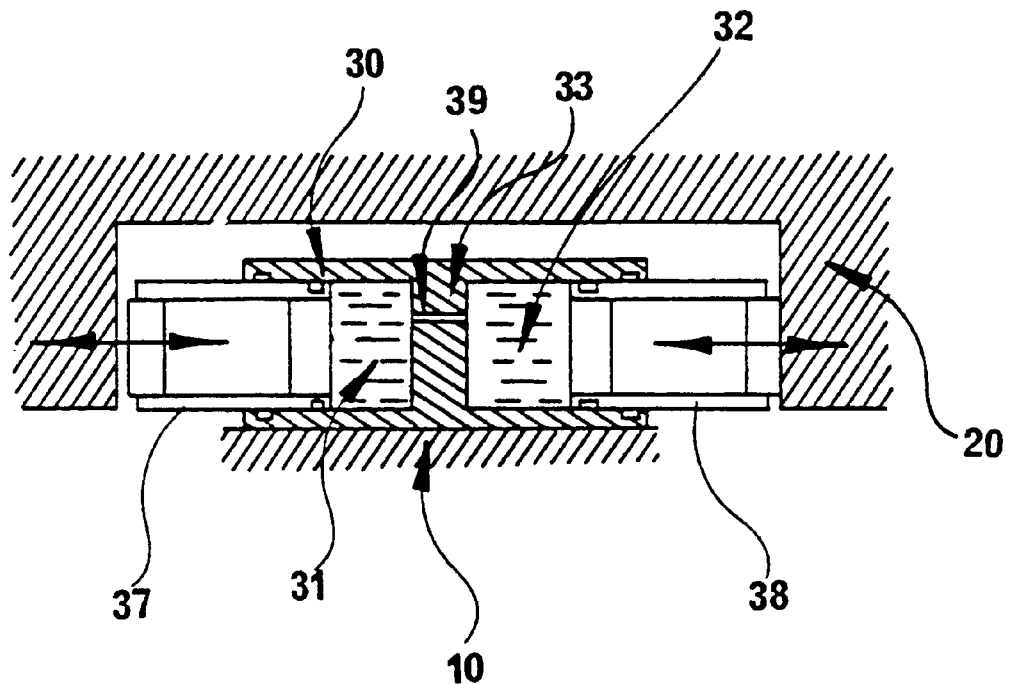
FIG. 3 is a diagrammatic view of another advantageous embodiment of a tie device of the invention.
Figure 4:
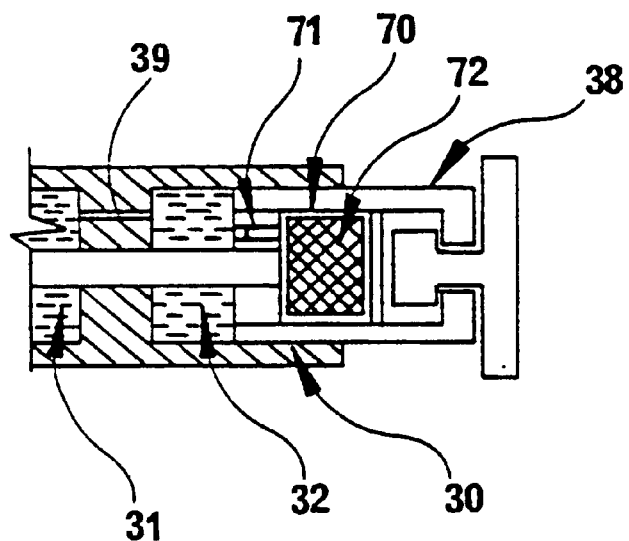
FIG. 4 is a diagrammatic view of an advantageous embodiment of a tie device of the invention incorporating an expansion vessel internal to the device.

To mitigate this drawback, the invention makes provision to replace the moving separator wall 33 with a separator wall or diaphragm 33 that is stationary relative to the cylinder 30, as shown in FIGS. 2 and 3. The stationary wall 33 may be fixed to said cylinder (FIG. 2), or it may be integral therewith (FIGS. 3 and 4). With reference more specifically to FIG. 2, the cylinder 30 is thus fixed to the structural element 10, and the wall 33, which is stationary relative to the cylinder 30, defines the two chambers 31 and 32. Advantageously, said wall 33 incorporates the above-described small orifice 39. Each chamber 31 and 32 is defined at its end remote from said wall 33 by a moving piston, respectively referenced 37 and 38, which piston is displaced in fluid-tight manner in the cylinder 30. Both of the pistons 37 and 38 are secured to the second structural element 20. In FIG. 2, the piston 38 is mechanically coupled to the second structural element 20, whereas the other moving piston 37 is secured to said first piston 38 via a rod 60 which passes through said separator wall 33 that separates the chambers 31 and 32. More specifically, the piston 38 shown in FIG. 2 may be formed by a tube which, at its end remote from the chamber 32, is provided with means for fixing to said second structural element 20, which means generally permit a small amount of pivoting. For example, the second structural element 20 may be the deck of a bridge. The main advantage of this embodiment is that the rod 60 of the device is stressed in traction only, thereby eliminating almost all danger of the rod buckling, so that the size of the rod can be minimized. This solution is particularly well suited when it is necessary to damp the effects of an earthquake in the axial direction, i.e. when the structural elements 10, 20 that are to be tied together face each other in the direction of their displacement.

In the embodiment shown in FIG. 3, which shows a tie device that couples a bridge pier 10 to a bridge deck 20, the rod 60 may be omitted all together. For this purpose, each of the two moving pistons 37 and 38 may be made in the form of a tube which, at its end in the vicinity of its respective chamber 31 or 32, is displaced in fluid-tight manner in the cylinder 30 which is fixed to the bridge pier 10. The other end of each of the pistons 37 and 38 is provided with stops, for example, or with any means, hinged or otherwise, enabling it to be coupled mechanically to the second structural element 20. In this case, the pistons 37 and 38 are not coupled together.

In the event of an earthquake, at least one of the two pistons 37, 38 is stressed, and it compresses the fluid in its respective chamber. The separator wall 33 incorporates the small orifice 39, and operation of the damper is similar to that described above. In this embodiment, the device is very compact because the working section of the piston is maximized because of the absence of the rod. In addition, since the rod is replaced by tubular pistons having much larger second moments of area, buckling is much less critical, and generally does not need to be taken it into account.

Another advantageous characteristic of the invention is shown diagrammatically in FIG. 4. In order to avoid providing an expansion vessel or tank outside the damper device, as shown under reference 100 in FIG. 1, the invention provides a tank 70 in at least one of the moving pistons. This tank 70 is connected to at least one of said chambers 31, 32 by a small duct 71 advantageously provided with a check valve (not shown) that instantly isolates the tank 70 from the chamber to which it is connected whenever the pressure in said chamber increases above a pre-set value. The tank 70 is filled partially or totally with a compressible material 72 suitable for being compressed to enable said fluid substance to expand. For example, the compressible material 72 may be a foam made of a plastics material, e.g. an elastomer, compatible with the fluid substance used in the device. This foam contains closed air cells, and it is therefore highly compressible. It is thus the tank 70 that acts as an expansion vessel, and it does so very effectively, thereby avoiding the need to provide a hydraulic circuit external to the device.

On assembling the device, the tank 70 is filled with fluid, as are the chambers 31 and 32. The only air contained in the tank is the air in the cells of the foam 72. Under normal operating conditions, the device is not subjected to any significant internal pressure. When the temperature of the fluid increases the fluid expands and, via the orifices which connect the chamber(s) 31, 32 to the tank 70 of the piston, the fluid compresses the air contained in the cells of the foam, thus raising the pressure of the fluid since it is confined. Since the fluid expands very slowly, it can be considered that it does so at constant temperature. The increase in the volume of fluid is thus of the same order of magnitude as the compression of the air in the cells. It is necessary merely for the volume of foam to be large enough to ensure that the overall increase is kept down to values that are entirely acceptable, of about a few bars at the most. Another advantage of this embodiment is that it has no vents or bleed points, and it thus enables the device to be installed and to operate in any position. The check valve (not shown) provided on the duct 71 enabling the chambers 31, 32 to communicate with the foam-containing tank 70 protects the tank and the foam against any possible deterioration while the device is in operation during an earthquake, in which case the pressure in the chambers can reach several hundred bars.

This advantageous characteristic of making it possible to omit the external expansion vessel is more particularly suitable in the context of the invention, i.e. when the central moving piston 33 of the force transmitter shown in FIG. 1 is replaced with one or two pistons 37, 38 that are tubular in shape. In which case, the tank 70 can be provided inside the tube(s) forming the piston(s) 37, 38, as shown in FIG. 4. Thus, the device as a whole is very compact, and the space it takes up is reduced to a minimum.

It should be noted, however, that such a tank 70 could also be implemented independently from the invention, e.g. in a wall of the cylinder, or even in the central moving piston of the device shown in FIG. 1.

The tie device of the invention is described above with reference to a force transmitter, but the device could also act as a damper. In which case, the orifice 39 would need to be larger and calibrated appropriately.

What is claimed is:

1. A tie device for use between first and second elements (10, 20) of a civil engineering structure, the tie device being suitable for enabling said first and second structural elements (10, 20) to be displaced relative to each other during slow movements, and for preventing said first and second structural elements (10, 20) from being displaced relative to each other during rapid movements, said device including a cylinder (30) which is stationary relative to said first structural element (10) and which defines two chambers (31, 32)

that contain a fluid substance and that are interconnected via an orifice (39), said tie device being characterized in that said cylinder (30) includes a wall (33) that separates said two chambers (31, 32), each chamber being defined at its end remote from said wall (33) by two moving pistons (37, 38), said two moving pistons (37, 38) being secured to said second structural element (20).

2. A device according to claim 1, in which said separator wall (33) for separating the two chambers (31, 32) is provided with said orifice (39) which interconnects said two chambers (31, 32) so as to enable said structural elements (10, 20) to be displaced relative to each other during slow movements.

3. A device according to claim 1, in which a first piston (38) of said two moving pistons (37, 38) is secured to the second structural element (20), and the other moving piston (37) is secured to said first piston (38) via a rod (60) that passes through said separator wall (33) that separates the chambers (31, 32).

4. A device according to claim 1, in which both of the moving pistons (37, 38) are secured to the second structural element (20) and they are not coupled to each other directly.

5. A device according to any preceding claim, in which at least one of said moving pistons (37, 38) is tubular-shaped, one end of which is mounted to slide in a fluid-tight manner in the cylinder (30), the other end being provided with coupling means for coupling to said second structural element (20).

6. A device according to claim 1, in which at least one moving piston (37, 38) includes a tank (70) connected to at least one of said chambers (31, 32) via a small duct (71), said tank (70) being filled at least partially with a compressible material (72) to enable said fluid substance to expand.

7. A device according to claim 6, in which said compressible material (72) is a foam made of a plastics material that is compatible with said fluid substance.

8. A device according to claim 1, in which said civil engineering structure is a bridge, and said first and second structural elements (10, 20) comprises an abutment, a pier, or a deck of a bridge.

9. A device according to claim 1, in which the device is a force transmitter for enabling said first and second structural elements (10, 20) to be displaced relative to each other during slow movements, and for preventing said first and second structural elements (10, 20) from being displaced relative to each other during rapid movements.

* * * * *